United States Patent
Fischer

[11] Patent Number: 5,553,161
[45] Date of Patent: Sep. 3, 1996

[54] COPY REPRODUCTION APPARATUS FOR SCREEN PRINTING WITH COLOR CORRECTION

[75] Inventor: Hannes Fischer, Wörgl, Austria

[73] Assignee: Schablonentechnik Kufstein Aktiengesellschaft, Kufstein, Austria

[21] Appl. No.: 245,693

[22] Filed: May 18, 1994

[30] Foreign Application Priority Data

Jun. 29, 1993 [EP] European Pat. Off. .............. 93110370

[51] Int. Cl.⁶ ................... G06K 9/00; H04N 1/54
[52] U.S. Cl. .................. 382/167; 382/100; 358/504; 101/DIG. 29
[58] Field of Search .................. 382/1, 8, 17, 100, 382/111, 112, 162, 167; 356/402, 405, 406, 429; 101/114, 115, 127, 129, DIG. 29; 358/504, 518, 523, 536

[56] References Cited

U.S. PATENT DOCUMENTS

| | | | |
|---|---|---|---|
| 4,174,664 | 11/1979 | Arnott et al. | 101/127 |
| 4,203,360 | 5/1980 | Madwed | 101/129 |
| 4,349,279 | 9/1982 | Jung | 356/402 |
| 4,419,690 | 12/1983 | Hammes | 358/75 |
| 4,481,532 | 11/1984 | Clark et al. | 358/80 |
| 4,649,502 | 3/1987 | Keller et al. | 364/519 |
| 4,839,722 | 6/1989 | Barry et al. | 358/80 |
| 4,959,669 | 9/1990 | Haneda et al. | 346/157 |
| 5,068,810 | 11/1991 | Ott | 364/526 |
| 5,162,899 | 11/1992 | Naka et al. | 358/80 |
| 5,276,459 | 1/1994 | Danzuka et al. | 346/33 A |

FOREIGN PATENT DOCUMENTS

| | | | |
|---|---|---|---|
| 408507 | 1/1991 | European Pat. Off. | B41F 33/00 |
| 421003 | 4/1991 | European Pat. Off. | B41F 33/00 |
| 0529967 | 3/1993 | European Pat. Off. | H04N 1/46 |

*Primary Examiner*—Leo Boudreau
*Assistant Examiner*—Andrew W. Johns
*Attorney, Agent, or Firm*—Birch, Stewart, Kolasch & Birch, LLP

[57] ABSTRACT

In a process for creating a data base for the reproduction of a copy on a web of material, primary colors are first applied on a sample of the web of material singly, in pairs, or three together in different quantitative proportions of color (a1, a2, a3) in respectively predetermine screen areas (16). Then, the individual screen areas (16) are colorimetrically measured in order to determine color correction values dependent on the quantitative proportions of color (a1, a2, a3). Thereafter, a dot-by-dot colorimetric measurement of the copy takes place in order to obtain, in each case, color values of the copy. The color values are then corrected by the color correction values in order to obtain corrected quantitative proportions of color for each dot of the copy. These corrected quantitative proportions of color are stored and can be used at a later point in time in order to define, for example, hole sizes in the screen printing stencils for reproduction of the copy.

9 Claims, 11 Drawing Sheets

COPY REPRODUCTION APPARATUS FOR SCREEN PRINTING WITH COLOR CORRECTION

BRIEF SUMMARY OF THE INVENTION

The invention relates to a process for creating a data base for the reproduction of a copy on a web of material and to a screen printing stencil for carrying out the process.

Until now it has been possible only in by a relatively laborious and involved process to convert a specimen copy drawn by an artist into a stencil engraving in order to provide printing stencils with such an engraving, and, in a following printing operation, to reproduce the specimen copy in a great number on a textile woven or knitted fabric, This process becomes particularly labour-intensive if it concerns the preparation of halftone engravings, that is to say if the coloured specimen copy includes a great many shades and these shades for the most part differ only slightly.

Among the causes of the difficulties which result is that, when printing textiles it is not possible to fall back on trichromatic methods, that is to say three-colour printing as is the case, for example, when printing onto paper. As known, three-colour printing is that printing technique in which use is made of the physiological phenomenon of human colour perception that the eye perceives reflected colours of light from sources which it is no longer able to resolve as mixed colours. Thus, coloured dots which comprise the colours blue, green or red which are very small in size and are positioned closely alongside one another are perceived by the eye as a mixture of colours. For example, small green and ed dots situated closely alongside one another are perceived as yellow, provided that the colour dots are light-emitting dots such as, for instance, in the case of a colour monitor.

This additive colour mixing is contrasted by subtractive colour mixing, for example by filters. Most colour printing processes are based on the subtractive mixing of colours. However, the difficulty increases in this sector if the relative position of the colour pigments with respect to one another is largely left to chance. This is precisely the case in textile printing owing to the mixture of large amounts of colour on the textile substrate. In addition, particularly in subtractive colour mixing, there arise further difficulties owing to the differing affinity of the dyes. Also, during a textile printing operation, the web of material is constantly pressed by the doctor blade and released again immediately thereafter, so that the printing ink already on the web of material flows out of the capilliaries formed by the fibres and subsequently flows back into them again. In the case of small surface areas of the web of material coloured by different printing inks, this flowing process results in a mixing of the wet dye pastes, which likewise can be controlled only with difficulty. The reproduced specimen therefore often deviates in its colours from the specimen copy drawn by an artist, or the original copy.

The invention is based on the object of providing a process with which specimen copies created by an artist can be reproduced even more accurately with regard to their colour composition on a web of textile material. The aim of the invention is also to specify a screen printing stencil suitable for carrying out the said process.

A process according to the invention for creating a data base for the production of a copy on a web of material is distinguished by the following steps:

on a sample of the web of material, primary colours F1, F2, F3 are applied lying one above the other in different quantitative proportions of colour a1, a2, a3 in respectively predetermined screen areas RB, the individual screen areas RB are colorimetrically measured in order to determine colour correction values dependent on the quantitative proportions of colour a1, a2, a3, a dot-by-dot colorimetric measurement of the copy takes place in order to determine in each case colour values of the copy, the determined colour values are corrected by the colour correction values in order to obtain corrected quantitative proportions of colour for each dot of the copy, and the corrected quantitative proportions of colour are stored.

Thus, according to the invention, with the aid of the primary colours first of all a sample print is produced on that web of material on which the artist's copy is also to be reproduced later. Sample print and reproduction of the copy take place under exactly the same conditions. In this case, in the sample printing, all of the primary colours are printed lying one above the other in the respective screen areas so as to be precisely different in quantitative proportions of colour. The different influences, such as for example the mixing behaviour of the primary colours, their affinity to the web of material, etc., are then among the parameters directly ascertained in the subsequent colorimetric measurement of the individual screen areas and consequently also directly determine the colour correction values obtained on the basis of the measurement. If the colour values obtained in the dot-by-dot colorimetric measurement of the copy are corrected by the previously determined colour correction values, a reproduction of the specimen copy created by an artist can be produced with even better color fidelity. In this case, the colour values of the copy corrected by the colour correction values or the respectively associated quantitative proportions of colour are initially stored in an electronic memory, to be used later for the purpose of preparing a screen printing stencil. In this case, the through-openings in the screen printing stencil for each colour are then established such that they coincide with the respectively intermediately stored quantitative proportions of this particular colour. It goes without saying that the artist's copy can be colorimetrically measured first and then the sample printed, it being possible for all the measured values to be intermediately stored in a suitable way.

Owing to the effects already described, in textile printing the result of colour mixing of shades which differ very considerably is particularly difficult to determine. Instead of a desired bright colour impression, therefore often dark colour impressions are obtained, that is to say rather grey to black. In order that an appealing result is achieved here too according to the invention, blended shades are still produced from closely neighbouring shades, because these also do not tend as readily towards grey or dark colour mixings when the colours run into one another. As a result, lively but nevertheless soft colour compositions are achieved.

According to a particularly advantageous refinement of the invention, to determine the colour correction values dependent on the quantitative proportions of colour, the colour vectors obtained in the colorimetric measurement of the individual screen areas of the material web sample are compared with such colour vectors which are obtained on the basis of a colour-vectorial calculation based on the quantitative proportions of the primary colours for the respective screen area.

According to another very advantageous further aspect of the invention, to determine the colour correction values dependent on the quantitative proportions of colour, use may also be made of such colour vectors obtained in the colorimetric measurement of the individual screen areas of the material web sample which respectively lie closest to the colour vectors determined in the dot-by-dot colorimetric measurement of the copy. In this case, as closest colour vectors, use can be made of those which have been determined by interpolation of a plurality of colour vectors from screen areas of the material web sample which lie alongside the colour vector of the copy. For producing the sample print, three primary colours are used, which are printed in the screen areas alone, in pairs and three together. If more than three primary colours are used, three of them in a group in each case are printed on in the screen areas alone, in pairs and three together. Generally, three primary colours or primary colours combined in groups of three suffice to be able to determine sufficiently accurate colour correction values for correcting the colour values of the copy. In exceptional cases, however, more than three colours or less than three colours may also be used.

If the proportions of colour of the primary colours existing in the respective screen areas are to be determined quantitatively, the respective primary colours which are used in the sample print are in the same way separately applied to the sample of the web of material outside a screen defined by the screen areas. Individual primary colours are thus printed onto the web of material separately in a way corresponding to the quantitative proportions respectively used, in order subsequently to be cut out and weighed.

The applying of the primary colours to the web of material in different quantitative proportions can take place in various ways. For this purpose, for example, use may be made of a perforated stencil, by which the quantitative proportions of colour can be determined by different hole sizes of the perforated stencil being preset. In the case of three primary colours, three perforated stencils are then used, that is one for each primary colour. Suitably arranged screen areas in the respective perforated stencils then ensure the desired printing of the primary colours one on top of the other with the desired proportions. The quantitative proportions of colour can also be preset by different hole densities of the perforated stencil. Each of the perforated stencils has at least one screen with a plurality of screen areas which are of the same size, are arranged in the form of an equilateral triangle and in each case have a permeability which decreases Screen area by screen area from the point of the triangle in the direction of the opposite side of the triangle. In the case of three perforated stencils designed in such a way, the screens are offset by 120°, so that the primary colours can then be printed onto the sample of the web of material in the different proportions. In this case, the number of screen areas along one side edge of the triangle may be four or more.

BRIEF DESCRIPTION OF THE DRAWINGS

The invention is described in more detail below with reference to the drawing, in which.

DETAILED DESCRIPTION

Figure 1:
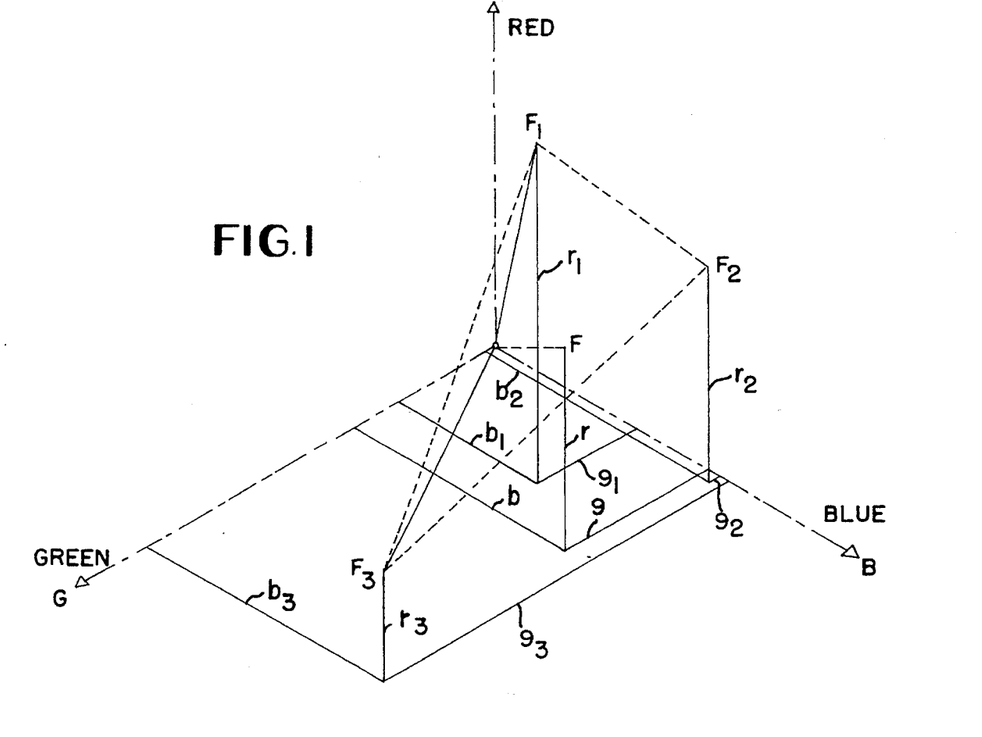
FIG. 1 shows a diagram for explaining colour vectors in a colour space.

For a better understanding of the invention, the case of colour mixing which is based exclusively on an additive mixing of the reflected light will first be considered with reference to FIG. 1. For this purpose, it is assumed that a plurality of printing inks or primary colours have been defined and that, of these three colours, which are not to differ starkly from one another, three dabs of colour which are very small but of different sizes have been produced lying directly along-side one another on a very thin web of material. Then, the incident white light is reflected in a filtered manner from each of these three colours, so that it mixes to form a new shade for the eye, which is at a sufficient distance away so that the individual dabs are not resolvable by the viewer. These ratios are represented in FIG. 1, which shows a cutout from the RGB colour space (red/green/blue colour space). The three defined printing inks or primary colours F1, F2, F3 can be broken down into their red, green and blue colour components. Accordingly, for the colour F1 the components r1, g1 and b1 are obtained. These are represented in the form of the components of the vector of the colour F1 in the RGB colour space. The same applies to the vectors of the colours F2 and F3. The end points of these vectors define a planar triangle in the RGB space.

This triangle in turn forms together with the colour vectors F1, F2 and F3 a pyramid, the point of which lies at the origin of the RGB system of coordinates and the base area of which is the triangle just described. In dependence on the size ratios of the three dabs of colour, the RGB components of the three colours F1 to F3 are combined to form a resulting colour vector F, and this corresponds to the colour of the light impression produced. However, this applies only if no unprinted places of the background of the web of material remain between the dabs of colour. If there are white or coloured flecks of the background of the web of material between the dabs of colour, a further colour reflected directly from there is added in the vector F of the mixed colour.

By virtue of the addition of the colour vectors, each of the shades within the pyramid described can be achieved. In this case, the size of each individual vector of the colour vectors to be added corresponds to the relative proportion of the respective primary colour resulting from the size of the dab.

However, with regard to the smallness of the dabs of colour required, usually a mixing of the colours in the liquid state cannot be prevented. In this case, various optical and chemical problems additionally occur. As already mentioned at the beginning, it cannot be foreseen whether colour pigments will be deposited alongside one another or lying one on top of the other. In the first case additive colour mixing rules applying and in the second case subtractive colour mixing rules apply. Also, in the case of thin pigment layers, interference effects may occur as a consequence of their layer thickness and, finally, a changing of the shade is possible by the dyes being absorbed by the fibres at a different rate, and consequently at a different intensity, in the following steaming and/or drying process. Specifically in the case of subtractive dyes, which are popularly used for the print-patterning of textile sheet-like structures or webs of material, this is very often the case.

For this reason, according to the invention only in the RGB space are neighbouring shades used for colour mixing, because with these at least some of the side effects described do not occur to such a great extent.

In addition, in the case of the invention, a sample print is prepared with such neighbouring shades, these shades being printed in different quantitative ratios at least partially lying one on top of the other on a web of material through a suitable set of stencils and the blended shades produced are measured colorimetrically. As will to be explained, this printing operation may also be replaced by a nozzle spraying process.

In either the printing or spraying process, on some of the printed samples there will occur a deviation of the RGB components of the colour vectors of the mixed colours, established by measurement, in comparison with the components of those vectors which are obtained on the basis of a colour-vectorial calculation based on the same colours with the same proportions of primary colours.

Figure 2:
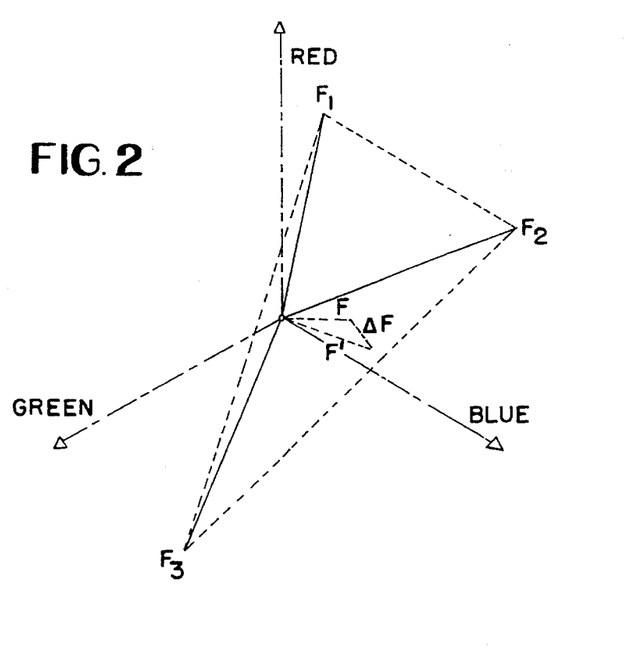
FIG. 2 shows a diagram for explaining a deviation between colour vectors of which one has been determined by printing on various colours in different quantitative proportions of colour on a web of material and subsequent measuring and the other has been determined by calculation on the basis of the quantitative proportions of colour used.

This and the following process step are illustrated in FIG. 2. Here again, three colour vectors F1, F2 and F3 are shown, which are intended to correspond to the three primary colours selected for colour superposing. The calculation on the addition theory of the mixing, taking into consideration the quantitative proportions of colour of the primary colours, yields the vector F for the mixed colour. In comparison, the measuring of the RGB components of the mixed colour produced in the actual printing test yields the vector F'. For the differential vector $\Delta F$, a transformation relationship can then be determined, which for its part is the basis for the calculation of correction values, which are used for correcting those colour vectors which are obtained from a colorimetric measurement of the copy to be reproduced.

This transformation relationship for the vectors of the defined printing inks F1, F2 and F3 must not yield any deficiency. On the other hand, the area in the RGB space between these colours is to be kept small. A transformation polynomial of at least the second order can be used and, if appropriate, supplemented by correction elements of a higher order. In this case, the area of the RGB space enclosed by the abovementioned primary colours can also be further subdivided by at least three interpolation points in order to substitute the transformation polynomial in the regions bounded by the interpolation-point and colour vectors by a linear approximation.

Using one of these transformation polynomials, a user dye table is then created, which assigns the colour vectors of the RGB space to the colour vectors which can be achieved in the mixing operation of the printing process and by means of which it is possible to ascertain from a desired shade the amounts of printing inks F1 to F3 necessary to attain that shade. Here, the desired shade is a colour vector obtained by colorimetric measurement of the copy. The results of this calculation are used for the determination of the size and distribution of the openings for the passage of ink in the screen printing stencil assigned to the respective colour F1 to F3, in order then to reproduce the copy by such screen printing stencils.

It is described below detail how the sample print can be used to ascertain the quantitative proportions of colour a1, a2 and a3 in order to be able to reproduce a point of the copy with the greatest possible colour fidelity.

The primary colours or basic dyes (=liquid printing pastes) F1, F2 and F3 are used to prepare a sample print on a web of material such as that which is also used later for the reproduction of the copy, and the colours are thereby printed with different quantitative ratios. Let the quantitative proportions of colour of the basic dyes in a mixed colour be:

a1 quantitative proportion of colour of F1,
a2 quantitative proportion of colour of F2,
a3 quantitative proportion of colour of F3.

The relative R, G, B intensities of the primary colours are:
r1, g1, b1 for F1
r2, g2, b2 for F2
r3, g3, b3 for F3

The colour vectors in the RGB space for the primary colours F1 to F3 then become:

$$\vec{F1} = r1 \times \vec{R} + g1 \times \vec{G} + b1 \times \vec{B}$$

$$\vec{F2} = r2 \times \vec{R} + g2 \times \vec{G} + b2 \times \vec{B}$$

$$\vec{F3} = r3 \times \vec{R} + g3 \times \vec{G} + b3 \times \vec{B} \tag{1}$$

After preparation of the sample print, it is initially expected that a colour produced by mixed printing will have a corresponding vector, the colour value of which should be obtainable by calculation according to the following linear relationship:

$$a1 \times \vec{F1} + a2 \times \vec{F2} + a3 \times \vec{F3} = \tag{2}$$

$$(a1 \times r1 + a2 \times r2 + a3 \times r3) \times \vec{R} +$$

$$(a1 \times g1 + a2 \times g2 + a3 \times g3) \times \vec{G} +$$

$$(a1 \times b1 + a2 \times b2 + a3 \times b3) \times \vec{B}$$

However, this expectation is only actually fulfilled in rare cases. Due to the different affinity of the dyes and other influences, the measured colour vector $\vec{MF}$ of the sample print mixed colour deviates from the above calculated result (M and m denote mixed colour):

$$\vec{MF} = rm \times \vec{R} + gm \times \vec{G} + bm \times \vec{B} \neq \tag{3}$$

$$(a1 \times r1 + a2 \times r2 + a3 \times r3) \times \vec{R} +$$

$$(a1 \times g1 + a2 \times g2 + a3 \times g3) \times \vec{G} +$$

$$(a1 \times b1 + a2 \times b2 + a3 \times b3) \times \vec{B}$$

The mixed colour vectors obtained must be corrected. Therefore, the following formulation with correction elements is to be tried:

$$\vec{MF} = a1 \times \vec{F1} + a2 \times \vec{F2} + a3 \times \vec{F3} + \tag{4}$$

$$a1 \times (a1 - 1) \times k1 \times \vec{F1} + a2 \times (a2 - 1) \times$$

$$k2 \times \vec{F2} + a3 \times (a3 - 1) \times k3 \times \vec{F3}$$

This formulation has the following characteristics:

1. The correction elements are linearly dependent on the colour vector of the respective primary colour and quadratically dependent on the quantitative proportion of the latter.

2. The correction elements disappear if the quantitative proportion of the primary colour is equal to 0 or equal to 1.

The following necessary requirements are thereby fulfilled:

1. A colour correction vector can itself be only a linear combination of other colour vectors.

2. If the mixed colour comprises only one primary colour, the correction vector must be equal to zero.

3. If a primary colour is absent entirely, no colour correction is required for it.

The said sample print allows, for example, eighteen screen areas filled with mixed colours to be produced, in which areas the primary colours are in each case applied lying one on top of the other in different quantitative proportions of colour. Thus, in this case eighteen different mixed colours are obtained. Each of these mixed colours is then measured for its red, green and blue components and the relationship following from (4) is set up for each mixed colour:

$$\vec{MF_i} = rm_i \times \vec{R} + gm_i \times \vec{G} + bm_i \times \vec{B} = \tag{5}$$

$$a1_i \times \vec{F1} + a2_i \times \vec{F2} + a3_i \times \vec{F3} +$$

$$a1_i \times (a1_i - 1) \times k1 \times \vec{F1} + a2_i \times$$

$$(a2_i - 1) \times k2 \times \vec{F2} + a3_i \times (a3_i - 1) \times k3 \times \vec{F3}$$

where ranges from 1 to 18 here and in the following relationship)

If the relationship (1) is entered into (5), the following is obtained for the right-hand side:

$$MFi = [a1_i \times r1 + a2_i \times r2 + \tag{6}$$

$$a3_i \times r3 + a1_i \times (a1_i - 1) \times k1 \times r1 +$$

$$a2_i \times (a2_i - 1) \times k2 \times r2 + a3_i \times (a3_i - 1) \times k3 \times r3] \times \vec{R} +$$

$$[a1_i \times g1 + a2_i \times g2 + a3_i \times g3 +$$

$$a1_i \times (a1_i - 1) \times k1 \times g1 + a2_i \times (a2_i - 1) \times k2 \times g2 +$$

$$a3_i \times (a3_i - 1) \times k3 \times g3] \times \vec{G} +$$

$$[a1_i \times b1 + a2_i \times b2 + a3_i \times b3 +$$

$$a1_i \times (a1_i - 1) \times k1 \times b1 + a2_i \times (a2_i - 1) \times$$

$$k2 \times b2 + a3_i \times (a3_i - 1) \times k3 \times b3] \times \vec{B}$$

By comparison with the left-hand side of (5), it follows that:

$$rm_i = a1_i \times r1 + a2_i \times r2 + a3_i \times r3 + a1_i \times (a1_i-1) \times k1 \times r1 + + a2_i \times (a2_i-1) \times k2 \times r2 + a3_i \times (a3_i-1) \times k3 \times r3 \tag{7a}$$

$$gm_i = a1_i \times g1 + a2_i \times g2 + a3_i \times g3 + a1_i \times (a1_i-1) \times k1 \times g1 + + a2_i \times (a2_i-1) \times k2 \times g2 + a3_i \times (a3_i-1) \times k3 \times g3 \tag{7b}$$

$$bm_i = a1_i \times b1 + a2_i \times b2 + a3_i \times b3 + a1_i \times (a1_i-1) \times k1 \times b1 + + a2_i \times (a2_i-1) \times k2 \times b2 + a3_i \times (a3_i-1) \times k3 \times b3 \tag{7c}$$

With the known variables r1, g1, b1, r2, g2, b2, r3, g3, b3 (=intensity values of the primary colours $a1_i$, $a2_i$, $a3_i$ (quantitative proportions of the primary colours in the mixed colour $_i$), and the measured colour intensity values $rm_i$, $gm_i$, $bm_i$ for the respective mixed colour, there thus follow 3 times 18=54 linear equations for the three unknown parameters k1, k2 and k3. These parameters must therefore be determined according to the principles of calculus of observations.

For printing reproduction of the copy (specimen copy created by an artist), the reverse procedure can be followed for determining the quantitative proportions a1, a2 and a3 of the primary colours F1 to F3 in a desired shade of the copy.

The colour values of the copy rv, gv and bv are measured, these known values are then entered into the left-hand sides of the three quadratic equations (7a) to (7c) and the latter are resolved to find a1, a2 and a3.

Owing to the large number of available equations (7a) to (7c) in determining the parameters k1 to k3, it could be considered to increase these parameters by a favourable formulation. Such a formulation could be such as the following:

$$\vec{MF} = a1 \times \vec{F1} + a2 \times \vec{F2} + a3 \times \vec{F3} + \tag{8}$$

$$a1 \times (a1 - 1) \times k1 \times \vec{F1} + a2 \times (a2 - 1) \times$$

$$k2 \times \vec{F2} + a3 \times (a3 - 1) \times k3 \times \vec{F3} +$$

$$a1 \times (a1 - 1) \times a2 \times (a2 - 1) \times k4 \times (\vec{F1} - \vec{F2}) +$$

$$a2 \times (a2 - 1) \times a3 \times (a3 - 1) \times k5 \times (\vec{F2} - \vec{F3}) +$$

$$a3 \times (a3 - 1) \times a1 \times (a1 - 1) \times k6 \times (\vec{F3} - \vec{F1})$$

If the primary colours are again entered here into the relationships (1), a system of three equations very similar to the relationships (7a) to (7c) is obtained by a calculation such as that described above for the RGB values of a mixed colour. For eighteen mixed colours, again there follow 3 times 18 equations, from which now the best approximations for the coefficients k1 to k6 can be determined.

From these coefficients and the RGB values of a desired colour (=colour of an artist's copy), on the other hand this system of equations can be used to determine retrogressively the quantitative proportions a1 to a3 of the primary colours for printing reproduction of this desired colour.

FIGS. 3a, 3b and 4 to 7 show how, for example, how the engraving for a set of stencils required for preparing the sample print may be composed, in order to obtain in this case eighteen mixed colours.

Such a set of stencils comprises three very similarly engraved stencils which consist of a very thin nickel foil and have at predetermined places various perforated areas or screen areas. Such stencils are generally produced purely galvanoplastically, which means that stencils with their openings are produced in a galvanic nickel bath by depositing nickel layer by layer on a mould covered by insulating points of photoresist.

Figure 3A:
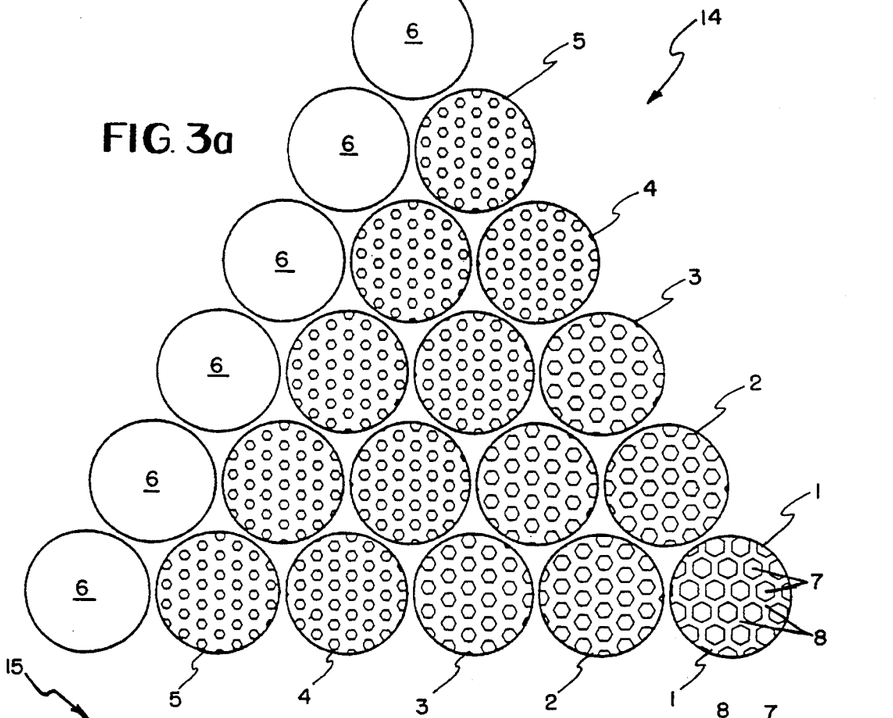
FIGS. 3a and 3b show screen areas arranged in the form of a triangle and another set of a test screens.

FIG. 3a shows a triangularly bounded area 14 in a rotary printing stencil. In the triangularly bounded area 14 there are twenty one circular sub-areas 1 to 6, which have different perforations. These perforations correspond to a hexagonal screen, that is to say the openings of these perforations correspond to a very small regular hexagon 7. Between these hexagons 7 there lie webs 8. The hexagonal openings 7 can then be varied in various ways, the ratio between the clear width of the opening and the width of the webs having a very strong influence on the amount of dye paste passing through when a sample print is made with such stencils. Of course, the web width must suffice to be able to withstand the stresses occurring during the printing operation, and the galvanoplastic production process also does not allow the webs to be as thin as desired.

In the sub-area 1, the perforation (also known as engraving) is chosen such that, while retaining sufficient strength, the maximum conceivable amount of dye can emerge through the openings 7 provided in this area. In the two circular subareas 2, there is provided an engraving which allows about 20% less dye through the openings 7 than in the subarea 1. By corresponding selection of the engraving, there then progressively emerges 20% less dye paste in each case in the areas 3, 4 and 5, so that in the subareas 5 there can emerge through the openings 7 only 20% of the amount of dye which leaves the stencil in the subarea 1. To those places of the web of material to which dye from the stencil considered here is applied from the subareas 2 to 5, dye is also applied to the web of material from the two other stencils belonging to the same set. To the places of the web of material which lie under the area 1, dye paste is applied to the web of material only from the stencil in question, while the circular areas 6, finally, are completely impermeable and do not differ in any way from the unengraved areas of the stencil. In these areas, dye is applied to the web of material only from the two other stencils belonging to the set.

Figure 3B:
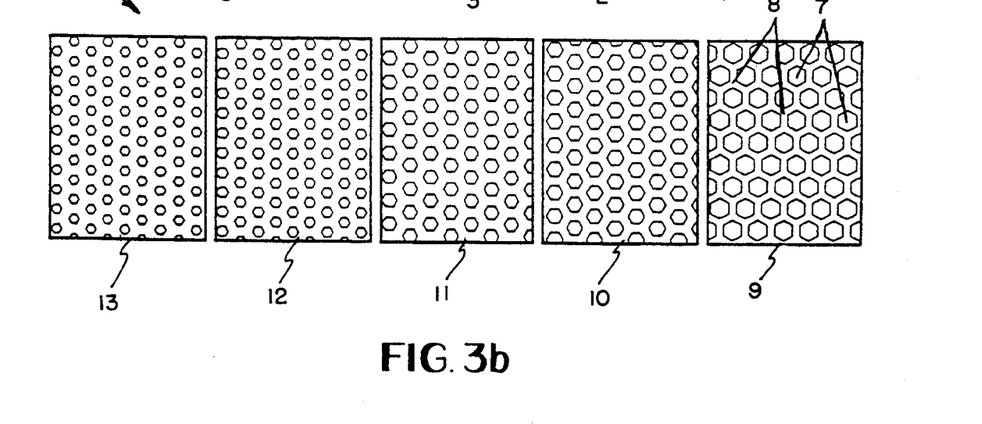

Apart from the engravings in the triangularly bounded area 14, on this stencil there is also a test screen or rectangularly bounded area 15, in which those identical engravings which are also to be found in the areas 1 to 5 are made in the rectangular (if appropriate square) subareas 9 to 13. On the material web sample piece, these areas are exclusively printed onto those places onto which neither of the other two stencils can print. These rectangular areas 15 are later cut out from the web of material, and the weight of the printing ink applied from the respective engraving is weighed on the basis of these cutouts. With the aid of this measure, it is possible to calculate the deviations in the amounts of ink from their intended amounts, which are based on influencing variables such as material web structure, doctor blade pressure, doctor blade form, viscosity of the dye paste, and the like.

Figure 4:
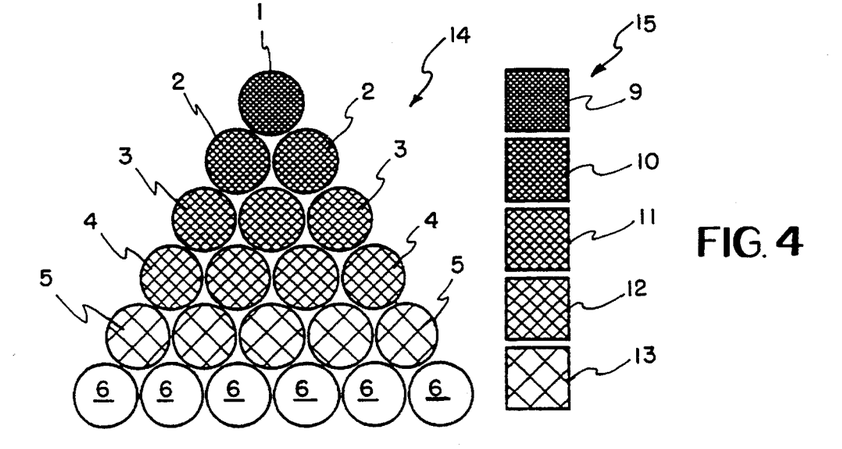
FIGS. 4, 5 and 6 show triangles which are in each case differently aligned and contain screen areas, with associated test screens, on different stencil bodies in each case.
Figure 5:
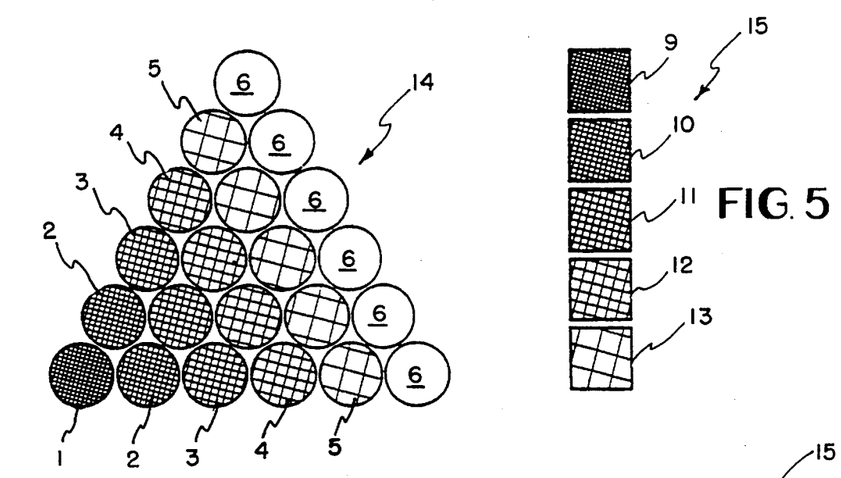
Figure 6:
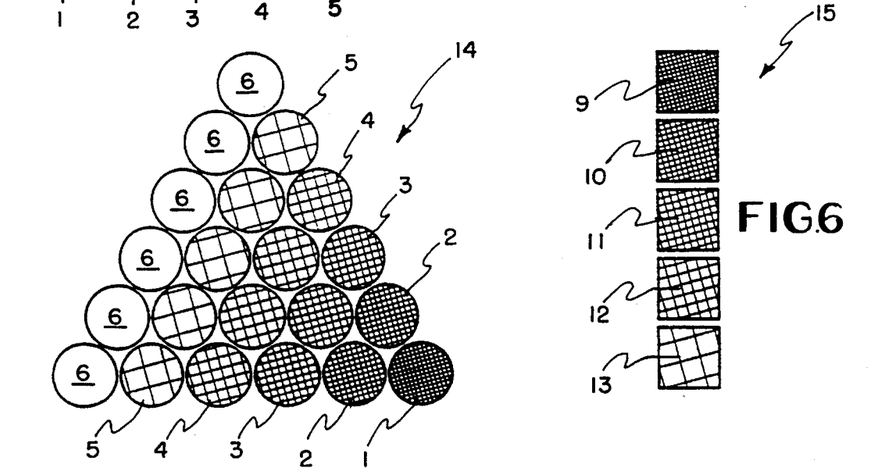

FIGS. 4 to 6 then show in the correct positions with respect to one another the engraving patterns which are made in the three stencils of the sample print set of stencils. Through each of these stencils only one of the primary colours is printed.

In FIG. 4 there is represented once again the triangularly bounded area 14, in which the engraved sub-areas 1 to 5 are provided, and also the rectangular area 15 (test screen) with the subareas 9 to 13. The subareas 9 to 13 have here the same structure in each case as the subareas 1 to 5. That is to say that the perforation is the same there. The density of the shading in the said areas corresponds to the amount of dye which can pass through the engraving. The closer the shading, the more dye passes through.

FIG. 5 shows the same conditions, but with respect to the second stencil of the set of stencils. It can be seen that the engraving or the triangular region 14 has been applied to this second stencil such that it is turned through 120° in comparison with the area 14 of the first stencil. In addition, the rectangular engraving area 15 is offset in the longitudinal section of the stencil in comparison with that in FIG. 4, so that this area 15 prints onto a section of the web of material which is not prewetted through the stencil of FIG. 4.

In FIG. 6, the engraving pattern of the triangular area 14 is turned through 240° in comparison with with the engraving pattern of the same area in FIG. 4. The rectangular area 15 is once again offset a little in the longitudinal direction of the stencil and, as a result, contacts only dry sections of the web of material which are not prewetted by other dyes.

Figure 7:
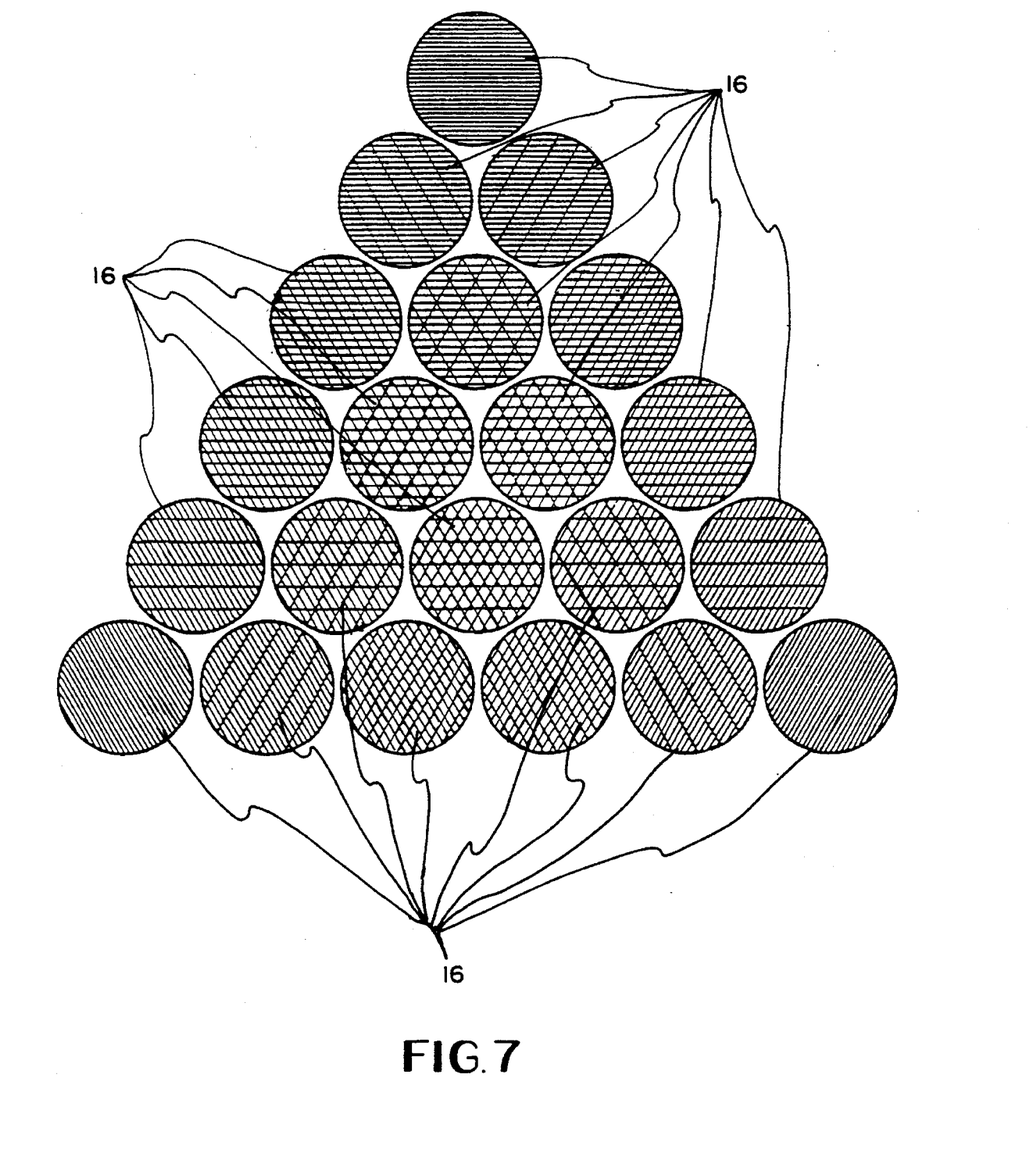
FIG. 7 shows a sample print on a web of material.

If the stencil engravings represented are printed onto a material web sample, the printed image of FIG. 7 is produced, at least as far as the triangular area 14 is concerned. The individual colours are differentiated here by the direction of the shading, their respective amount or intensity in turn being marked by the density of the shading. Since the three colours differ in shade, there is produced in each individual one of the multi-coloured circles 16 or screen areas produced by over-printing a different shade, which can then be measured with the aid of a colour scanner or spectrometer. Since, at the same time, the respectively applied amounts of dye can also be determined from the rectangular printed areas 15, this method can be used to determine all the parameters which are required for the composing of a halftone engraving.

FIGS. 8a to 8d show developed projections of lateral cylinder surfaces, provided with engravings, of four rotary screen printing stencils belonging to a set of stencils. With this set, four different printing inks are applied by mixed printing to any desired textile substrate with differing intensity, that is to say in different proportions. Here, the inks are held back to varying degrees by graduated permeabilities of the engraved areas in the stencil wall.

Item 17 denotes the developed lateral surface of the first stencil, 18 that of the second stencil and so on. Finally, 20 denotes the lateral surface of the fourth stencil. With these stencils, a colour print in which two or three colours are in each case mixed to form new shades is produced on a web of material with four selected different colours on a screen printing machine which is not included in the representation in the drawing. The web of material and the printing parameters are kept just the same as those values which are to be chosen in the case of the later print under consideration of a graphic copy created by an artist. To be specific, these are the sequence of the four colours, the type and form of the printing doctor blade, the printing speed, the chemical composition of the printing inks (dye, printing additives, rheological values and pH) and the type, duration and temperature control of the post-treatment processes (drying, steaming).

Figure 8A:
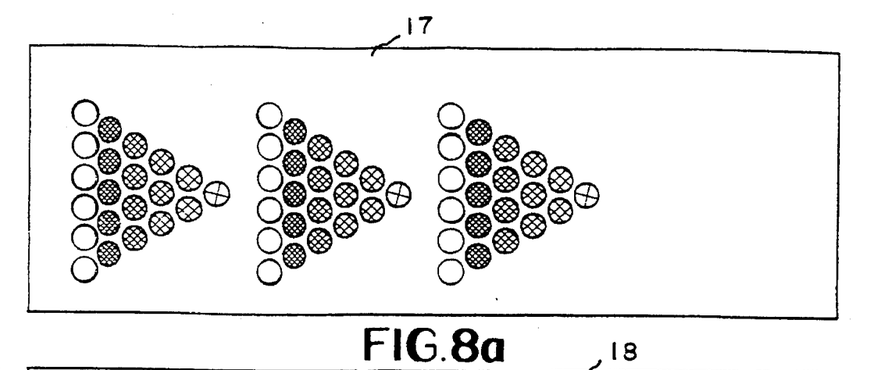
FIGS. 8a to 8d show developed projections of stencil bodies with triangles which are differently aligned and contain screen areas.
Figure 8B:
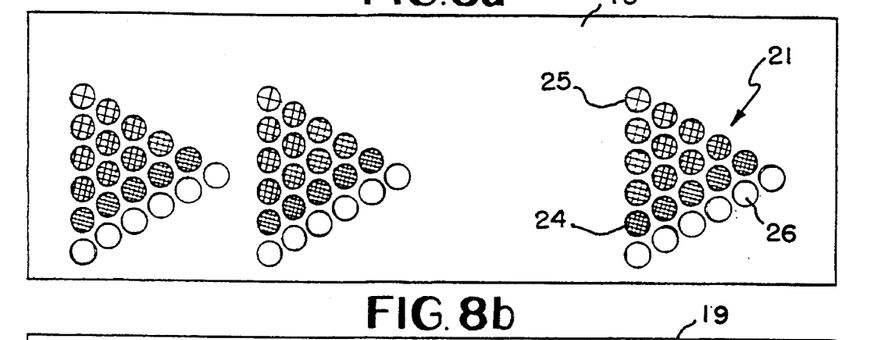
Figure 8C:
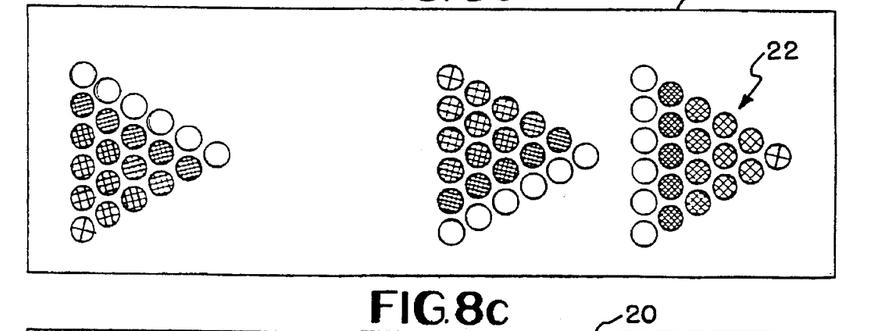
Figure 8D:
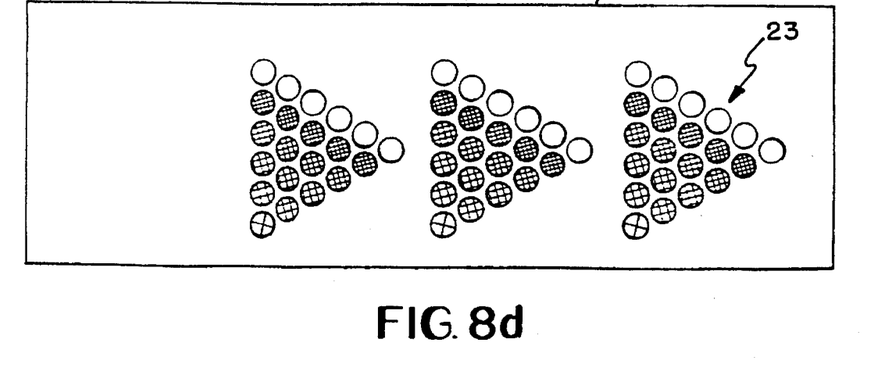
Figures 9A, 9B, 9C, 9D:
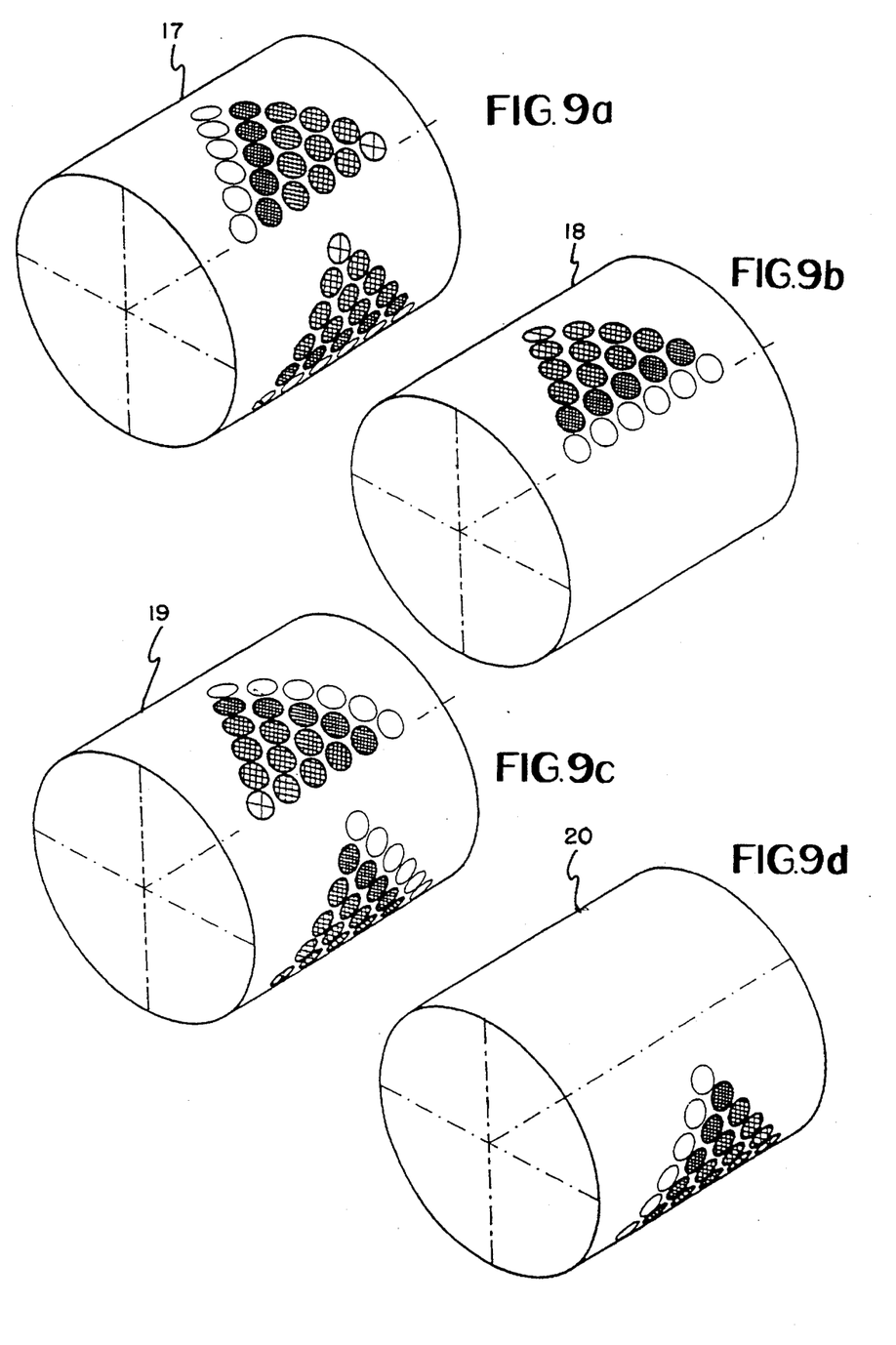
FIGS. 9a to 9d show perspective views of the stencil bodies according to FIGS. 8a to 8d, FIGS. 10a to 10e show developed projections of further stencil bodies with triangles which are differently aligned and contain screen areas.
Figure 10A:
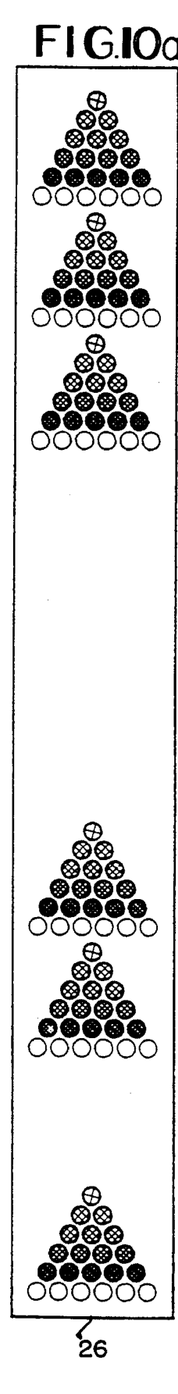
Figure 10B:
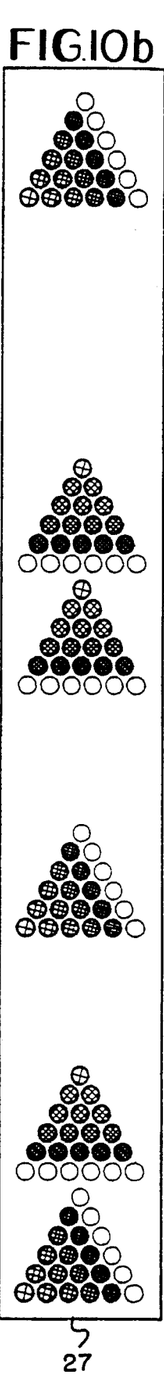
Figure 10C:
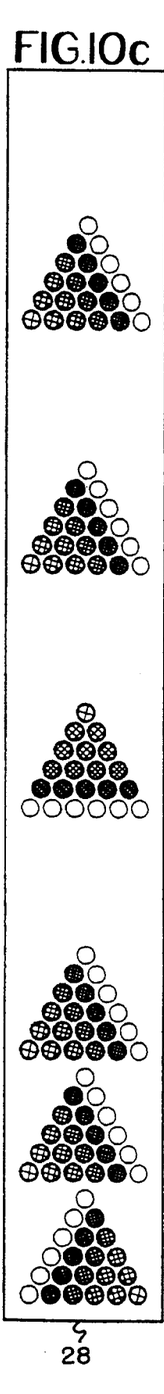
Figure 10D:
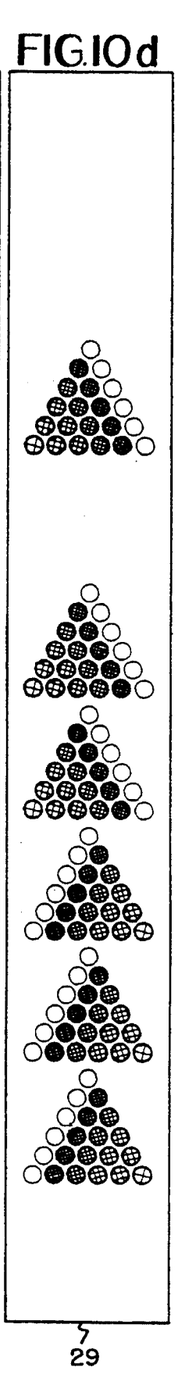
Figure 10E:
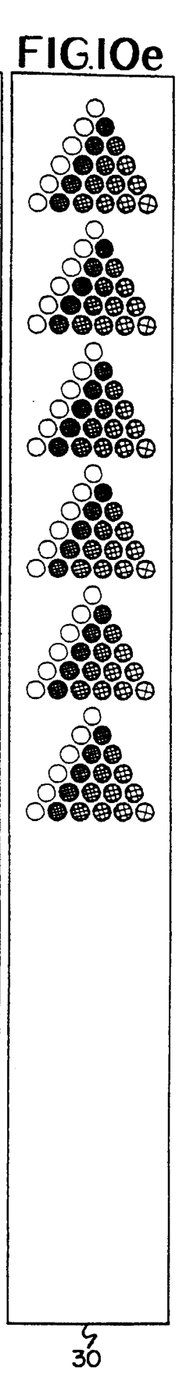
Figure 11A:
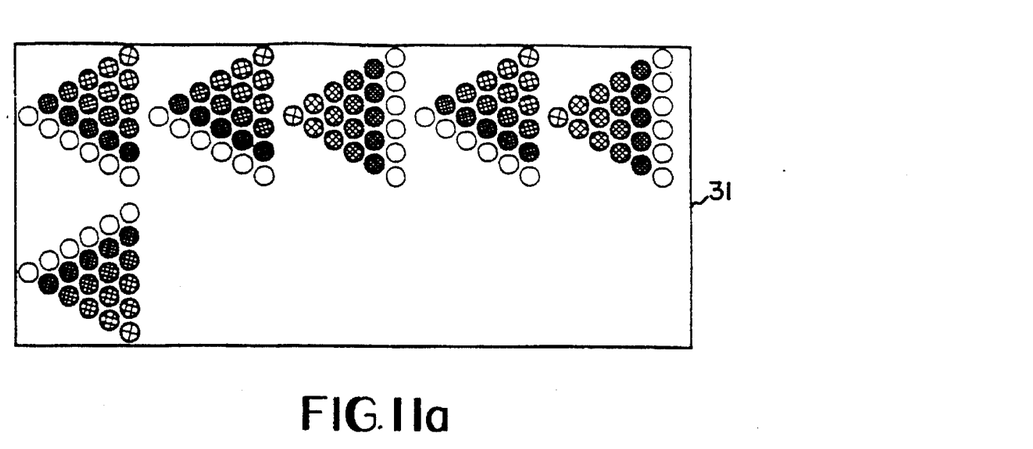
FIGS. 11a to 11e show developed projections of still further stencil bodies with triangles which are differently aligned and in each case contain screen areas.
Figure 11B:
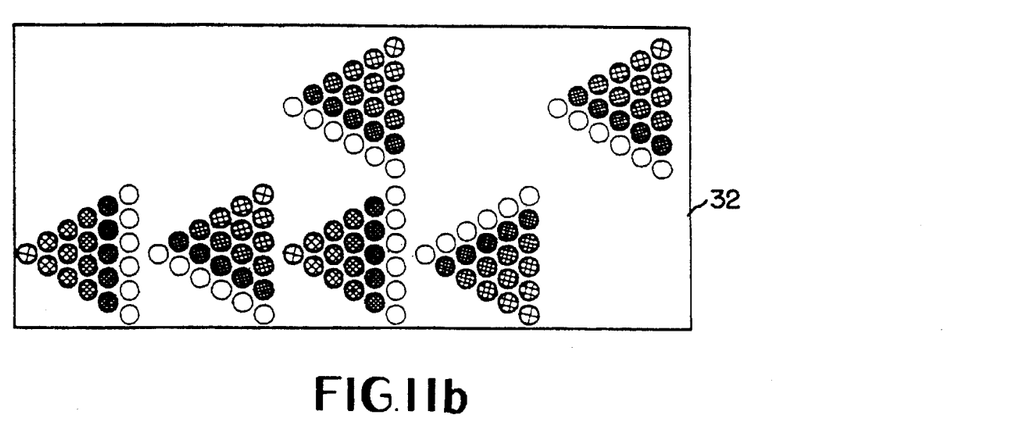
Figure 11C:
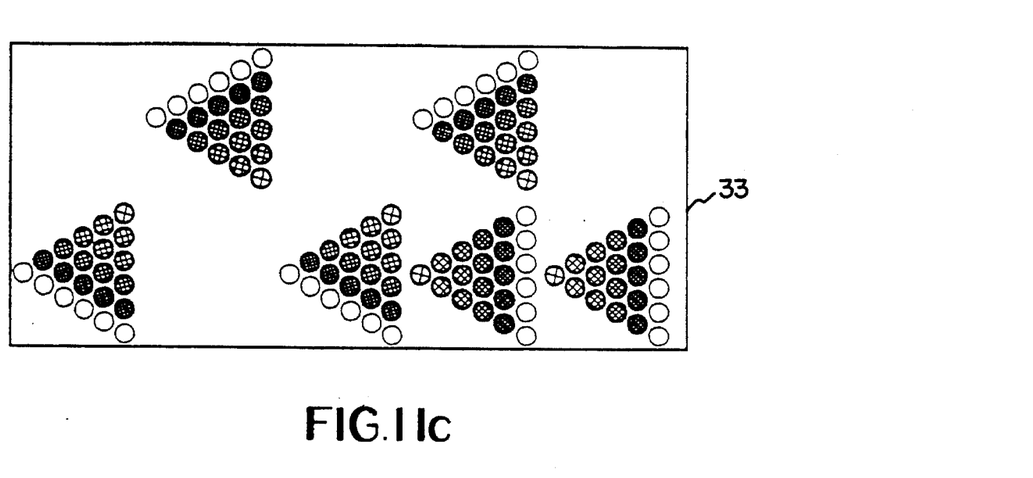
Figure 11D:
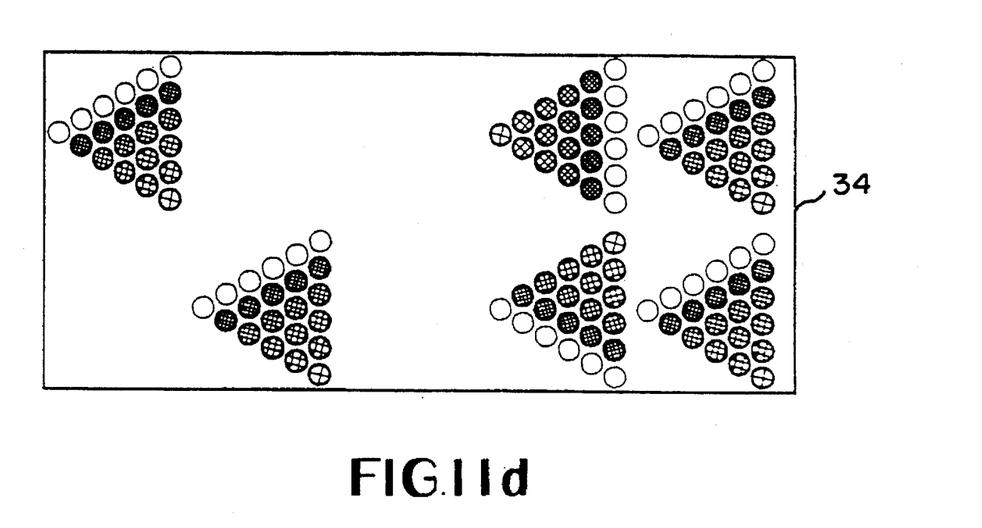
Figure 11E:
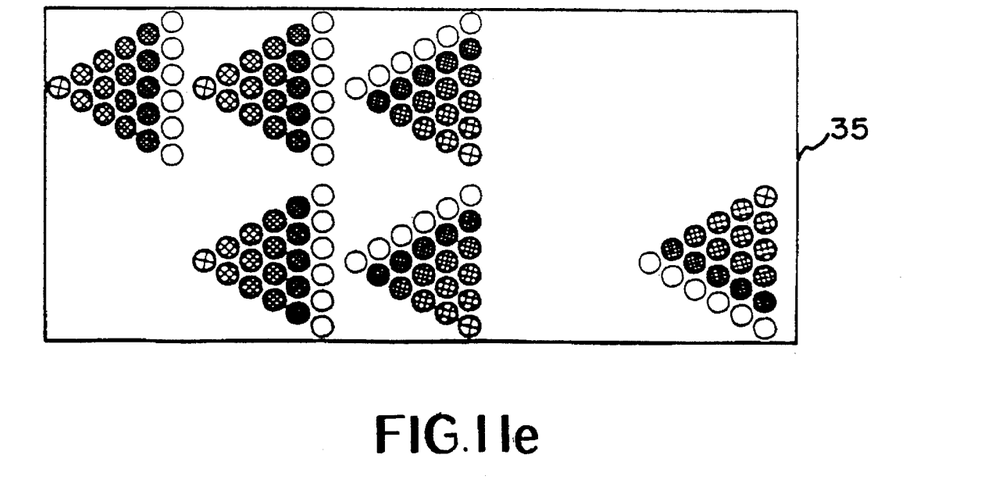

The engraving areas 21, 22 and 23 lying vertically one below the other in FIGS. 8b to 8d, respectively, are printed on the web of material such that they are in register with one another. The same takes place with the other engraving areas lying vertically one below the other.

In all these areas, the differing permeabilities of the stencil wall are indicated by varying the cross-hatching density, because the actually chosen screen perforations are so small that they can no longer be represented in the drawing with the scale chosen. In any event, a close hatching 24 means a low permeability and a wide hatching 25 means a large permeability. In between, the permeabilities are graduated. The circles 26 drawn by thin lines indicate impermeable places of the stencil, so the perforated circles represent permeable printing areas. Through the engraving areas 21, 22 and 23, again two or three colours are in each case applied one lying on top of the other by mixed printing.

Here too, the engraving pattern in each of the cooperating printing areas 21, 22 and 23 fills the surface area of an equilateral triangle. It can be seen that, starting in each case from a different point of a triangle, the permeability of the perforation decreases in the direction of the opposite side of the triangle.

In FIGS. 9a to 9d, the four screen printing stencils 17 to 20 are represented in their three-dimensional form and their engraving patterns, to the extent that the latter are visible. These screen printing stencils 17 to 20 correspond to the developed lateral surfaces of FIGS. 8a to 8d.

In FIGS. 10a to 10e, the developed projections 26 to 30 of the lateral cylinder surfaces of a set of stencils which comprises five stencils are represented. Each of these stencils prints a different colour. Thus, here five colours are printed. In each case two or three colours are mixed in the same way as explained in the case of FIGS. 8a to 8d on the web of material to be printed on. Since the developed projections 26 to 30 of the lateral cylinder surfaces run vertically here, the cooperating printing areas are found to be in horizontal rows in each case.

FIGS. 11a to 11e show stencil engravings which have been changed a little in comparison with those represented in FIGS. 10a to 10e in order to obtain stencils of smaller length but, in return, slightly larger diameter. This then provides the projected developments 31 to 35, which correspond to the projected developments 26 to 30 in FIGS. 10a to 10e.

As an alternative to the correction described earlier using the transformation polynomial, for determining the colour correction values dependent on the quantitative proportions of colour it is also possible to use those colour vectors obtained in the colorimetric measurement of the individual screen areas of the material web sample which in each case lie closest to the colour vectors determined in the dot-by-dot colorimetric measurement of the copy.

A colour vector which is obtained in the scanning of the artist's copy then needs to be assigned merely the closest colour vector of the colour vectors obtained in the measurement of the sample, so that in this way the quantitative proportions of colour are available directly for reproducing the corresponding dot of the artist's copy.

If the colour vector measured from the artist's copy is surrounded by a plurality of colour vectors of the sample, the latter can also be used for the interpolation of a suitable sample colour vector and consequently for the determination of suitable quantitative proportions of colour by interpolation. In the interpolation, the sample colour vectors surrounding the colour vector of the copy may be weighted, for example, according to their distance from the copy colour vector.

Figure 12:
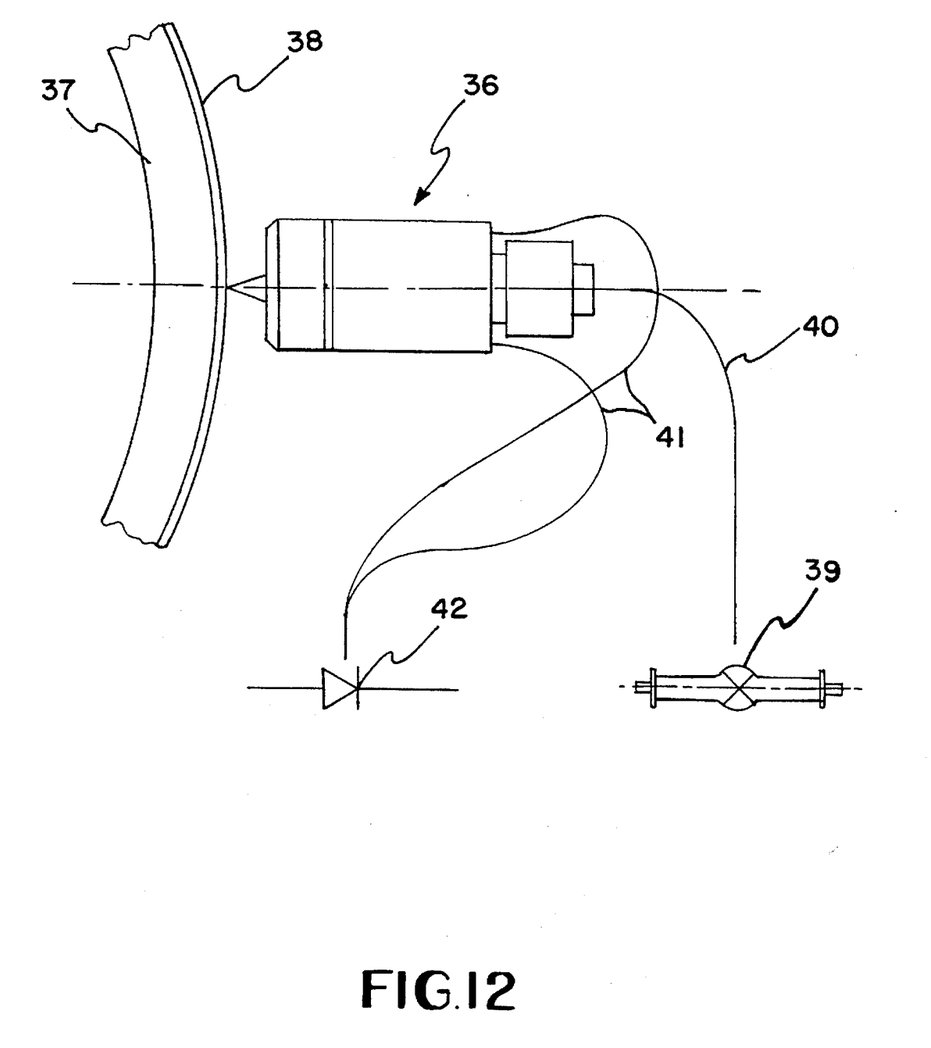
FIG. 12 shows an optical scanning device for the colorimetric measurement of a copy.

FIG. 12 shows an arrangement for the colorimetric measurement of the artist's copy or of the screen areas included in the sample print.

An optical scanning system with an optical scanning head 36 serves for scanning the artist's copy 38 fastened on a rotating cylinder 37. White light from a light source 39 passes into an optical fibre 40 in order to be able to illuminate with this light the artist's copy 38 (or the screen areas of the sample print) dot by dot. The light source 39 may be, for example, a xenon high-pressure lamp. With the aid of optical fibres 41, light reflected at the artist's copy 38 is collected and transmitted to a photodetector arrangement 42, which has colour-selective characteristics. In order to obtain a distinct relationship between the signals supplied by the photodetector arrangement 42 and the position of the scanning light spot on the artist's copy 38, the scanning frequency in copy scanning, the path of movement of the optical scanning head 36, the position of the artist's copy 38 on the cylinder 37 and the rotational speed of the cylinder 37 are preset or stored.

If the artist's copy 38 is to be scanned, it is first of all mounted onto the cylinder 37. It is then illuminated dot by dot with white light from the light source 39. The light reflected by the artist's copy 38 is collected by means of the optical fibres 41, the intensity of the reflected light being measured in three wavelength ranges, to be precise with the aid of the already mentioned photodetector arrangement 42. The measured values are successively converted into digital values and intermediately stored in an electronic memory before they are corrected. The wavelength ranges in which measuring is carried out may lie between 420 and 480 µm for the colour blue, between 480 and 570 µm for the colour green and between 570 and 650 µm for the colour red. The respective intensity values in these wavelength ranges correspond to the quantitative proportions of colour.

Figure 13:
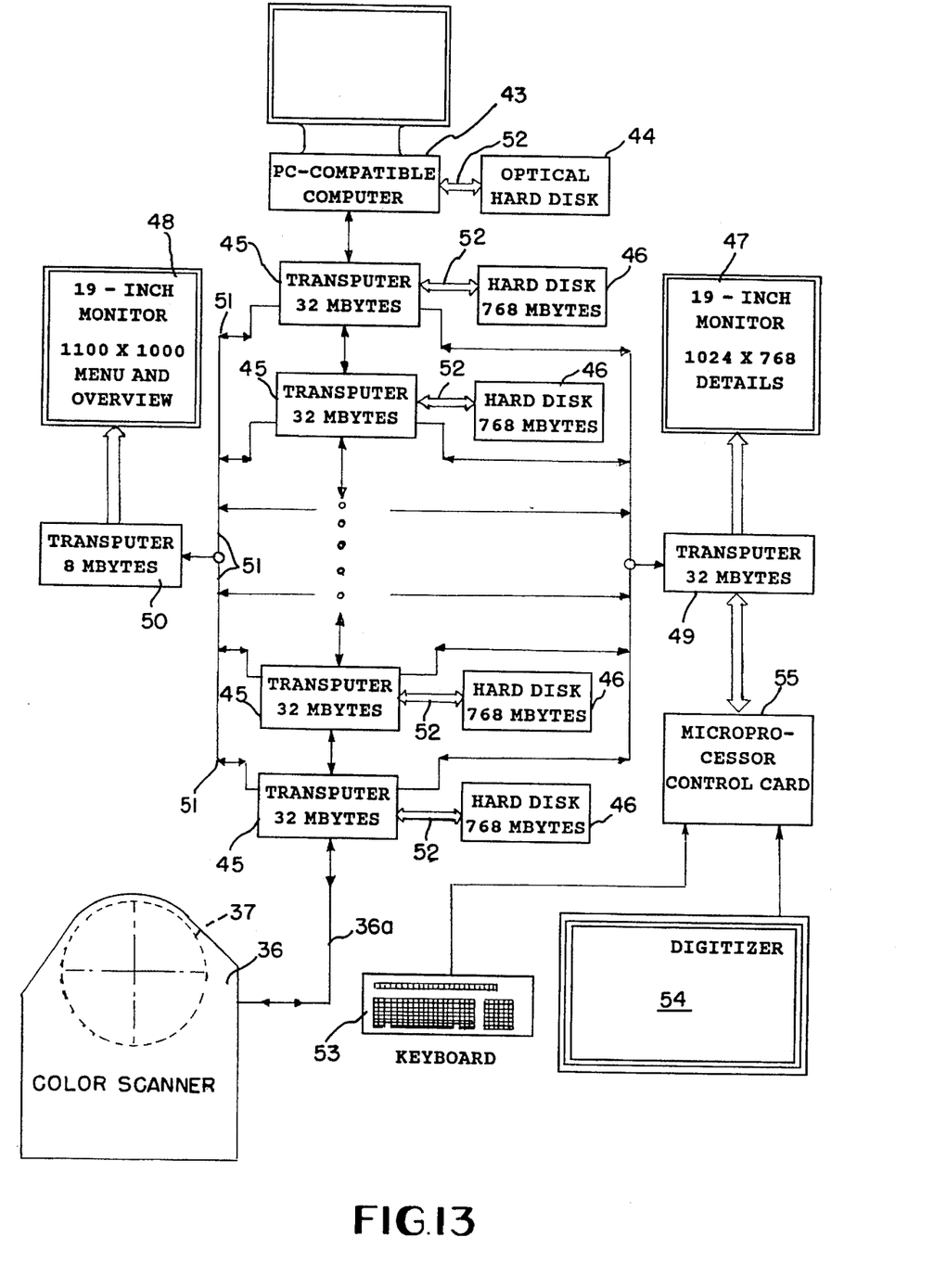
FIG. 13 shows a block diagram of the overall set-up of a device for carrying out the process according to the invention.

In FIG. 13, a scanning and data processing device is represented. It includes two large video screens, of which one serves for displaying the sample copy. It also displays the operator menu and also has space for interactive input and output. The other large video screen can be used for displaying a cutout of the sample copy to be processed. This has the advantage that all the sample data and information required for processing are visually available simultaneously.

In FIG. 13, 43 denotes a PC-compatible computer with its input video screen, which serves as an operator system for the downstream part of the installation. This is also provided as a file server for an optical hard disk 44, which stores the ready-processed sample data. The downstream part of the installation essentially comprises a plurality of transputers 45. Each of these transputers 45 comprises a central processor unit, which is equipped with a floating-point processor and a memory unit on the same chip. Located on the same board is a 32-Mbyte RAM. Each of these transputers 45 is assigned its own magnetic hard disk 46 with a storage area of 768 Mbytes. For example, four such units are used. This makes it possible to arrange for the sample read line by line from the sample copy by means of the colour scanner 36 to be processed in groups which respectively comprise a multiplicity of lines by the individual transputers 45. As a medium for the quantities of data temporarily occurring during processing, each transputer 45 is assigned the hard disk 46. The entirety of the sample data is accordingly divided in parallel into a plurality of hard disks 46 and is similarly processed in parallel by the transputers 45.

The detail monitor 47 and the overview monitor 48 serve to present a visual representation of the stage reached in work. The detail monitor 47 is driven by the video transputer 49 and the overview monitor 48 is driven by the video transputer 50.

For the purpose of data exchange, the transputers 45 are interconnected via very fast serial bidirectional data transfer lines 51, also known as computer links. The data transfer from and to the hard disks 46 is carried out via an 8-bit wide parallel bus line 52. This last-mentioned bus line 52 is separately connected between each transputer 45 and the assigned hard disk 46. This means that the data transfer between each transputer 45 and its hard disk 46 can be handled such that the traffic of all other transputers 45 and their hard disks 46 is not impaired and thus can be dealt with in the fastest possible way.

The video transputer 49 has the task of transmitting the data of the latest sample copy cutout to the detail monitor 47. For this purpose, it is equipped with a 32-Mbyte RAM. In addition, it has the task of processing the input data from the keyboard 53 and also the input data from the digitizer 54. In order for it to be relieved of monitoring the input devices keyboard 53 and digitizer 54, there is provided an autonomous microprocessor control card 55, which is constantly monitored to ascertain whether and from where data are input. This microprocessor control card 55 is equipped with a dual-ported RAM, in order that data both from the transputer 49 and the microprocessor which is provided on the same card 55 can be entered into the memory area of this card 55 or read from this memory area.

Both the data obtained in the colorimetric measurement of the artist's copy and the data obtained in the colorimetric measurement of the sample print are sent via a data transfer line 36a from the colour scanner 36 to the transputers 45. In this case, the transputers 45 carry out the calculations for determining the quantitative proportions of colour a1, a2 and a3 of the primary colours F1 to F3 for the respectively scanned shade of the artist's copy, that is to say the correction of the colour vectors obtained in the scanning of the artist's copy. These quantitative proportions of colour are then stored either on the hard disk 44 or in other memories of the transputer 45. They can be called up later in order to be able with their aid to reproduce the artist's copy on the said web of material, as already described. For this purpose, these quantitative proportions of colour can be used to preset hole sizes in screen printing stencils for the respective colours or, if the artist's copy is to be reproduced by ink nozzles, spray pressures, nozzle opening times, and the like.

It should also be pointed out that the sample print according to FIG. 7 can also be prepared not only by using screen printing stencils but also with the aid of ink spraying nozzles. The quantitative proportions of colour in the different screen areas can in such a case be preset by different spraying-on times and/or spraying-on pressures.

I claim:

1. A process for creating a data base for the reproduction of a color copy or original on a web of material, characterized by the following steps:

(a) on a sample of the web material, creating a test chart by applying to each of a plurality of predetermined areas a unique quantitative proportion of pigments of the primary colors, the quantitative proportions being representative of all possible combinations of said pigments covering quantitative ranges for each pigment;

(b) generating equations for calculating color vector values considering non-linear effects resulting from the quantitative proportions of primary colors as used in said test chart areas;

(c) colorimetrically measuring the various areas of said test chart to determine actual color vectors resulting from such applied quantitative proportions of primary colors;

(d) using the generated equations for calculating color vector correction values for each area of said test chart, based on the data obtained in step (c);

(e) colorimetrically measuring the copy or original to be reproduced, dot-by-dot, to determine color vector values to be reproduced;

(f) determining the proportion of said pigments to be applied, for each dot of said original or copy to be reproduced, based on the measured color vector values of step (e) and the results of step (d);

(g) storing the results of step (f).

2. The process according to claim 1 wherein the color vectors obtained in the colorimetric measurement of the said various areas are compared with color vectors obtained on the basis of a color vectorial calculation based on the quantitative proportions of the primary colors for the respective area so as to determine said color correction values.

3. The process according to claim 1 wherein to determine the values in step (f), use is made of color vectors obtained in the measurement of the said screen areas which respectively lie closest to color vectors determined in the dot-by-dot measurement of said copy or original to be reproduced.

4. The process of claim 3 wherein, as said closest color vectors, use is made of color vectors determined by interpolation of a plurality of color vectors from various areas of the material web sample which lie alongside the color vector of the original or copy to be reproduced.

5. The process of claim 1 wherein said primary color pigments are additionally applied to separate areas of the sample web material in the same quantitative proportions as in said test areas for quantization of the amount of pigments in said test areas.

6. The process according to claim 1 wherein the primary colors are printed onto the sample of the web by means of a perforated stencil.

7. The process according to claim 6 wherein the quantitative proportions of color are preset by using different hole sizes in the perforated stencil.

8. The process according to claim 1 wherein the primary colors are sprayed onto the sample of the web by means of a nozzle device.

9. The process according to claim 8 wherein the quantitative proportions of color are preset by different spraying-on times and/or different spraying-on pressures.

* * * * *